United States Patent
Higashi et al.

(10) Patent No.: US 10,083,327 B2
(45) Date of Patent: Sep. 25, 2018

(54) CARD READER AND CONTROL METHOD THEREFOR

(71) Applicant: NIDEC SANKYO CORPORATION, Suwa-gun, Nagano (JP)

(72) Inventors: Katsuhisa Higashi, Nagano (JP); Yukihiko Takita, Nagano (JP); Kazutoshi Ishikawa, Nagano (JP); Hiroshi Kawate, Nagano (JP); Tadashi Taguchi, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 0 days.

(21) Appl. No.: 15/513,829

(22) PCT Filed: Aug. 21, 2015

(86) PCT No.: PCT/JP2015/073516
§ 371 (c)(1),
(2) Date: Mar. 23, 2017

(87) PCT Pub. No.: WO2016/047328
PCT Pub. Date: Mar. 31, 2016

(65) Prior Publication Data
US 2017/0286728 A1 Oct. 5, 2017

(30) Foreign Application Priority Data
Sep. 26, 2014 (JP) .................... 2014-196424

(51) Int. Cl.
*G06K 7/08* (2006.01)
*G06K 19/00* (2006.01)
(Continued)

(52) U.S. Cl.
CPC ........... *G06K 7/087* (2013.01); *G06K 19/042* (2013.01); *G06K 19/06196* (2013.01)

(58) Field of Classification Search
CPC .......... G06K 7/08; G06K 7/089; G06K 19/06; G06K 19/04; G06K 19/00
(Continued)

(56) References Cited

U.S. PATENT DOCUMENTS

| | | | | |
|---|---|---|---|---|
| 5,767,495 A | * | 6/1998 | DeLand, Jr. | G06K 7/084 235/449 |
| 8,556,168 B1 | * | 10/2013 | Lewis | G07F 19/2055 235/379 |
| 2015/0115031 A1 | * | 4/2015 | Hoson | G06K 13/0868 235/449 |

FOREIGN PATENT DOCUMENTS

| | | |
|---|---|---|
| JP | 2001067524 A | 3/2001 |
| JP | 4425674 B2 | 3/2010 |

(Continued)

OTHER PUBLICATIONS

International Search Report corresponding to Application No. PCT/JP2015/073516; dated Oct. 27, 2015, with English translation.
(Continued)

*Primary Examiner* — Daniel Hess
(74) *Attorney, Agent, or Firm* — Cantor Colburn LLP (57) ABSTRACT

A card reader may include a magnetic sensor to detect whether magnetic data are recorded in the magnetic stripe of the card; a control section to supply electric power to the magnetic sensor and into which an output signal of the magnetic sensor is inputted; and a card insertion port into which the card is inserted and in which the magnetic sensor is disposed. The magnetic sensor may output an output signal when the electric power is supplied from the control section. The control section may supply the electric power to the magnetic sensor during a first supply time period which is shorter than a card passage time period.

12 Claims, 3 Drawing Sheets

(51) Int. Cl.
*G06K 19/04* (2006.01)
*G06K 19/06* (2006.01)
(58) Field of Classification Search
USPC .................................................. 235/449, 379
See application file for complete search history.

(56) References Cited

FOREIGN PATENT DOCUMENTS

| | | |
|---|---|---|
| JP | 2010205187 A | 9/2010 |
| JP | 2012118689 A | 6/2012 |
| WO | 2012085967 A1 | 6/2012 |

OTHER PUBLICATIONS

Extended European Search Report corresponding to Application No. 15843506.5-1203/3200117 PCT/JP2015073516; dated Apr. 4, 2018.

\* cited by examiner

CARD READER AND CONTROL METHOD THEREFOR

CROSS REFERENCE TO RELATED APPLICATIONS

This is the U.S. national stage of application No. PCT/JP2015/073516, filed on Aug. 21, 2015. Priority under 35 U.S.C. § 119(a) and 35 U.S.C. § 365(b) is claimed from Japanese Application No. 2014-196424, filed Sep. 26, 2014, the disclosure of which is incorporated herein by reference.

FIELD OF THE INVENTION

At least an embodiment of the present invention relates to a card reader comprising a magnetic sensor for detecting whether magnetic data are recorded in a magnetic stripe of a card or not. Further, at least an embodiment of the present invention relates to a control method for the card reader.

BACKGROUND

Conventionally, a card reader structured to read magnetic data recorded on a card has been known (see, for example, Patent Literature 1). A card reader described in Patent Literature 1 includes a magnetic head for reading magnetic data recorded on a card. Further, the card reader includes a pre-head (magnetic head) for detecting whether magnetic data are recorded in a magnetic stripe of a card inserted into a card insertion port or not.

In an industry where a card reader is utilized, illegal acquisition of a signal outputted from a pre-head by a criminal who illegally acquires magnetic information recorded in a card, so-called "tapping" has conventionally become a large issue. In the card reader described in Patent Literature 1, a false signal output circuit structured to output a signal different from the signal corresponding to magnetic data recorded in a card is provided in an inside of the pre-head and thus, even when a criminal acquires a signal outputted from the pre-head, the criminal is unable to acquire a signal corresponding to magnetic data recorded in the card. Therefore, in the card reader, illegal acquisition of magnetic information by a criminal is prevented.

CITATION LIST

[PTL 1] Japanese Patent Laid-Open No. 2010-205187

As described above, in the card reader described in Patent Literature 1, a false signal output circuit is provided in an inside of a pre-head and thus illegal acquisition of magnetic information by a criminal is prevented. However, in the card reader, a false signal output circuit is provided in the inside of the pre-head and thus the pre-head is expensive and, as a result, a cost of the card reader is increased.

SUMMARY

In view of the problem described above, at least an embodiment of the present invention provides a card reader which is capable of preventing illegal acquisition of magnetic information by a criminal and reducing its cost although it is capable of detecting whether magnetic data are recorded in a magnetic stripe of a card or not. Further, at least an embodiment of the present invention provides a control method for a card reader which is capable of preventing illegal acquisition of magnetic information by a criminal and reducing its cost although it is capable of detecting whether magnetic data are recorded in a magnetic stripe of a card or not.

To solve the above-mentioned problem, at least an embodiment of the present invention provides a card reader including a magnetic sensor structured to detect whether magnetic data are recorded in a magnetic stripe of a card or not, a control section which is structured to supply electric power to the magnetic sensor and into which an output signal of the magnetic sensor is inputted, and a card insertion part which is formed with a card insertion port into which a card is inserted and in which the magnetic sensor is disposed. The magnetic sensor outputs an output signal when the electric power is supplied from the control section and, in a case that a time period from a time when a recording area of magnetic data recorded in a magnetic stripe of the card inserted into the card insertion port starts to pass the magnetic sensor to a time when the recording area has finished to pass through the magnetic sensor is defined as a card passage time period, the control section supplies the electric power to the magnetic sensor for a first supply time period which is shorter than the card passage time period.

In the card reader in accordance with at least an embodiment of the present invention, the magnetic sensor for detecting whether magnetic data are recorded in a magnetic stripe of a card or not outputs an output signal when electric power is supplied. Further, in at least an embodiment of the present invention, the control section supplies electric power to the magnetic sensor during a first supply time period which is shorter than a card passage time period which is a time period from a time when a recording area of magnetic data recorded in a magnetic stripe of the card inserted into the card insertion port starts to pass the magnetic sensor to a time when the recording area has finished to pass through the magnetic sensor. Therefore, according to at least an embodiment of the present invention, when a card in which magnetic data are recorded in its magnetic stripe has passed through the magnetic sensor, the magnetic sensor outputs a part of a signal corresponding to the magnetic data recorded in the card as an output signal. However, the magnetic sensor does not output the entire signal corresponding to the magnetic data recorded in the card as an output signal, and thus a criminal cannot acquire the entire signal corresponding to the magnetic data recorded in the card from the magnetic sensor. Therefore, according to at least an embodiment of the present invention, although it can be detected based on an output signal of the magnetic sensor whether or not magnetic data are recorded in a magnetic stripe in a card inserted into the card insertion port, illegal acquisition of magnetic information by a criminal is prevented. Further, in at least an embodiment of the present invention, while detecting whether magnetic data are recorded in a magnetic stripe in a card or not by utilizing a commonly used magnetic sensor, illegal acquisition of magnetic information by a criminal is prevented and thus, a cost of the card reader can be reduced.

In at least an embodiment of the present invention, the control section supplies the electric power to the magnetic sensor during the first supply time period intermittently. According to this structure, electric power can be supplied to the magnetic sensor by a simple control when a magnetic stripe of a card is passed through the magnetic sensor. Accordingly, the card reader is easily controlled.

In at least an embodiment of the present invention, the card reader includes a card insertion sensor structured to detect that the card has been inserted into the card insertion port, and the control section supplies the electric power to the magnetic sensor during the first supply time period intermittently when it is detected based on a detected result of the card insertion sensor that the card has been inserted into the card insertion port. According to this structure, in comparison with a case that, even in a standby state before a card is inserted into the card insertion port, electric power is supplied to the magnetic sensor during the first supply time period intermittently, power saving of the card reader can be attained.

In at least an embodiment of the present invention, the control section executes an abnormality processing in a case that an output signal of the magnetic sensor is inputted into the control section when the control section does not supply the electric power to the magnetic sensor. According to this structure, even if a criminal performs a certain trick to make electric power be supplied to the magnetic sensor so that the magnetic sensor outputs the entire signal corresponding to magnetic data recorded in a card as an output signal, illegal acquisition of magnetic information by a criminal can be prevented.

In at least an embodiment of the present invention, the magnetic sensor is, for example, an MR sensor which utilizes a magnetoresistance effect.

Further, to solve the above-mentioned problem, at least an embodiment of the present invention provides a control method for a card reader including a magnetic sensor structured to detect whether magnetic data are recorded in a magnetic stripe of a card or not and a card insertion part which is formed with a card insertion port into which a card is inserted and in which the magnetic sensor is disposed. The control method includes previously providing the magnetic sensor structured to output an output signal when electric power is supplied to the magnetic sensor and, in a case that a time period from a time when a recording area of magnetic data recorded in a magnetic stripe of the card inserted into the card insertion port starts to pass the magnetic sensor to a time when the recording area has finished to pass through the magnetic sensor is defined as a card passage time period, the electric power is supplied to the magnetic sensor during a first supply time period which is shorter than the card passage time period.

In at least an embodiment of the present invention, the magnetic sensor for detecting whether magnetic data are recorded in a magnetic stripe of a card or not outputs an output signal when electric power is supplied. Further, in at least an embodiment of the present invention, electric power is supplied to the magnetic sensor during a first supply time period which is shorter than a card passage time period which is a time period from a time when a recording area of magnetic data recorded in a magnetic stripe of the card inserted into the card insertion port starts to pass the magnetic sensor to a time when the recording area has finished to pass through the magnetic sensor. Therefore, according to at least an embodiment of the present invention, when a card in which magnetic data are recorded in its magnetic stripe has passed through the magnetic sensor, the magnetic sensor outputs a part of a signal corresponding to the magnetic data recorded in the card as an output signal. However, the magnetic sensor does not output the entire signal corresponding to the magnetic data recorded in the card as an output signal, and thus a criminal cannot acquire the entire signal corresponding to the magnetic data recorded in the card. Therefore, according to at least an embodiment of the present invention, although it can be detected based on an output signal of the magnetic sensor whether or not magnetic data are recorded in a magnetic stripe in a card inserted into the card insertion port, illegal acquisition of magnetic information by a criminal is prevented. Further, in at least an embodiment of the present invention, while detecting whether magnetic data are recorded in a magnetic stripe of a card or not by utilizing a commonly used magnetic sensor, illegal acquisition of magnetic information by a criminal can be prevented and thus, a cost of the card reader can be reduced.

As described above, in at least an embodiment of the present invention, although it can be detected based on an output signal of the magnetic sensor whether magnetic data are recorded in a magnetic stripe of a card inserted into the card insertion port or not, illegal acquisition of magnetic information by a criminal is prevented and a cost of the card reader can be reduced.

BRIEF DESCRIPTION OF DRAWINGS

Embodiments will now be described, by way of example only, with reference to the accompanying drawings which are meant to be exemplary, not limiting, and wherein like elements are numbered alike in several Figures, in which.

DETAILED DESCRIPTION

An embodiment of the present invention will be described below with reference to the accompanying drawings.

Structure of Card Reader

Figure 1:
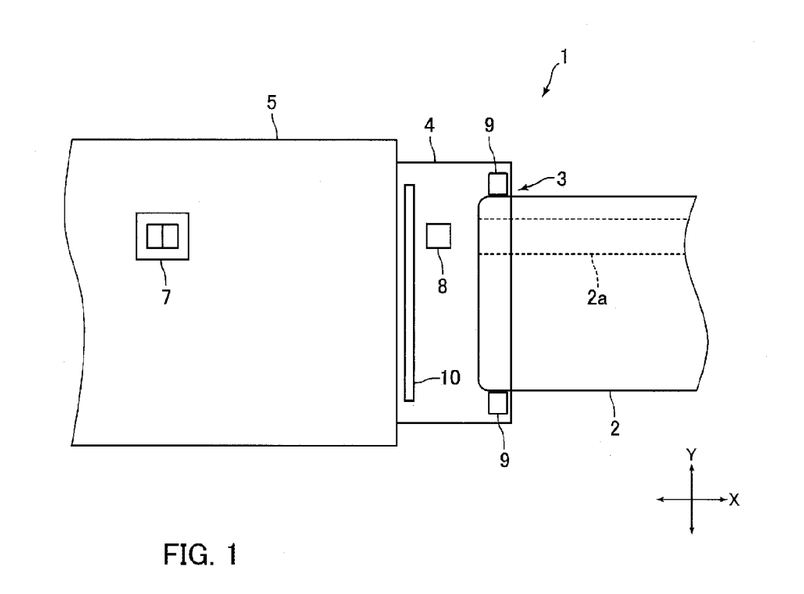
FIG. 1 is a schematic view showing a card reader in accordance with an embodiment of the present invention.
Figure 2:
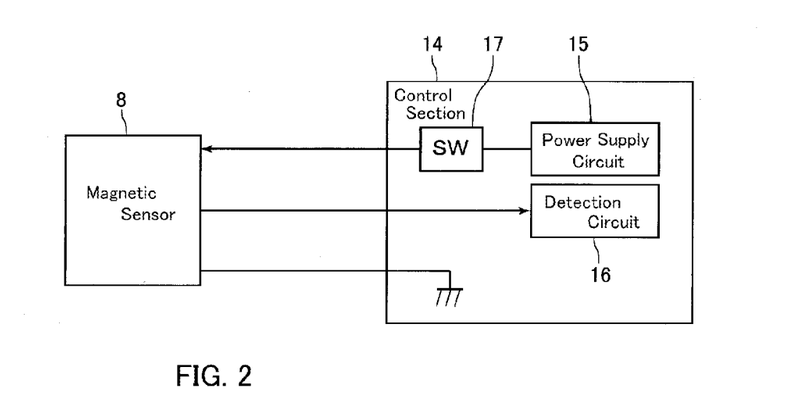
FIG. 2 is a block diagram showing a control section to which a magnetic sensor shown in FIG. 1 is connected.
Figure 3A:
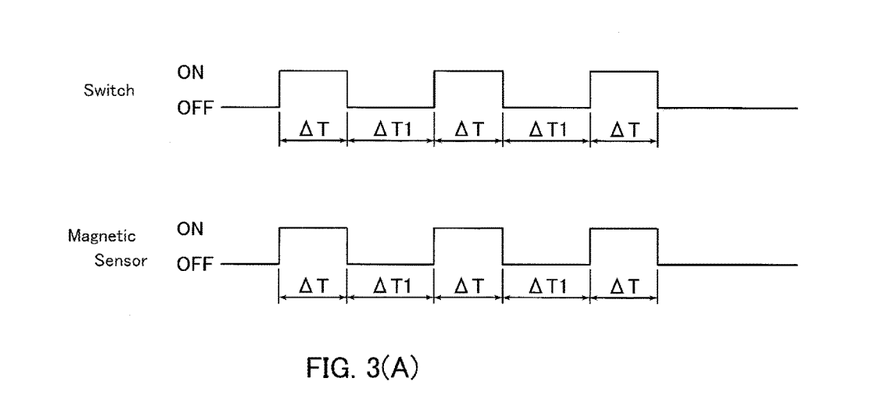
FIGS. 3(A) and 3(B) are views for explaining on/off timing of a magnetic sensor shown in FIG. 1.
Figure 3B:
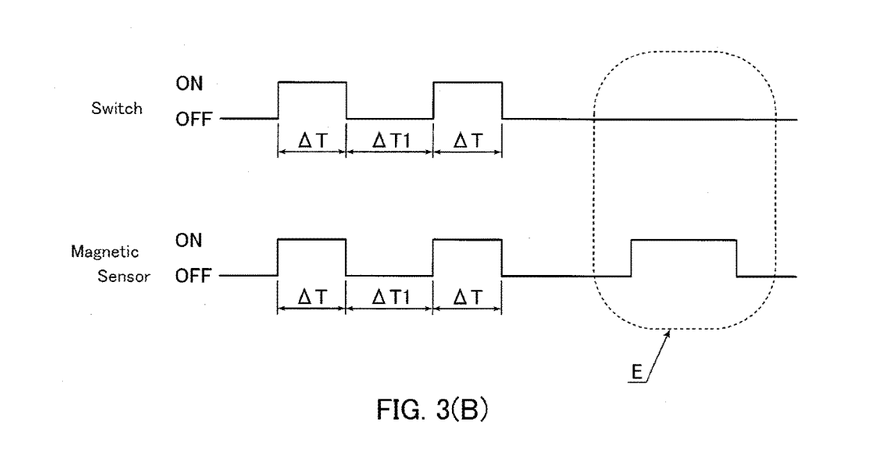

FIG. 1 is a schematic view showing a card reader 1 in accordance with an embodiment of the present invention. FIG. 2 is a block diagram showing a control section 14 to which a magnetic sensor 8 shown in FIG. 1 is connected. FIGS. 3(A) and 3(B) are views for explaining on/off timing of the magnetic sensor 8 shown in FIG. 1.

A card reader 1 in this embodiment is a device which is structured to perform reading of magnetic data recorded on a card 2 and/or recording of magnetic data on a card 2 and is, for example, mounted and used in a predetermined host apparatus such as an ATM. The card reader 1 includes a card insertion part 4 formed with an insertion port 3 into which a card 2 is inserted, and a main body part 5. A card passage where a card 2 inserted into the insertion port 3 is passed is formed in an inside of the card reader 1. In this embodiment, a card 2 is passed in the "X" direction shown in FIG. 1.

The card reader 1 includes a magnetic head 7 structured to perform reading of magnetic data recorded in a magnetic stripe 2a of a card 2 and/or recording magnetic data to the magnetic stripe 2a, a magnetic sensor 8 structured to detect whether magnetic data are recorded in a magnetic stripe 2a of a card 2 or not, card insertion sensors 9 structured to detect insertion of a card 2 into the card insertion port 3, and a shutter member 10 structured to open and close the card passage. The magnetic head 7 is disposed in the main body part 5. The magnetic sensor 8, the card insertion sensors 9 and the shutter member 10 are disposed in the card insertion part 4. Further, the card reader 1 includes a card conveying mechanism (not shown) structured to convey a card 2 in the card passage.

A card 2 is, for example, a rectangular card made of vinyl chloride whose thickness is about 0.7-0.8 mm. The card 2 is formed with a magnetic stripe 2a in which magnetic data are recorded. The magnetic stripe 2a is formed in a strip shape along a longitudinal direction of the card 2 which is formed in a substantially rectangular shape. Magnetic data can be recorded over a predetermined range in a longitudinal direction of the magnetic stripe 2a of the card 2. In other words, a recording area of magnetic data recorded in the magnetic stripe 2a is specified in the card 2. The card 2 is inserted into the card reader 1 and conveyed inside the card reader 1 in a state that a longitudinal direction of the card 2 is substantially coincided with the "X" direction (a passing direction of the card 2). In accordance with an embodiment, an IC chip and/or an antenna for communication may be incorporated in the card 2. Further, the card 2 may be a PET (polyethylene terephthalate) card whose thickness is about 0.18-0.36 mm or may be a paper card having a predetermined thickness.

The card insertion sensors 9 are, for example, a card width sensor structured to detect a width of the card 2 which is perpendicular to a passing direction of the card 2 and a thickness direction of the card 2. The card insertion sensors 9 include, for example, two sensor levers (not shown) capable of contacting with both end parts of a card 2 in a width direction of the card 2 ("Y" direction in FIG. 1), and contact switches or photo interrupters (not shown) structured to detect respective movements of the two sensor levers. When end parts of a card 2 inserted into the card insertion port 3 are contacted with the sensor levers and movements of the sensor levers are detected, it is detected that the card 2 has been inserted into the card insertion port 3.

The shutter member 10 is disposed on a rear side with respect to the card insertion sensors 9 in a passing direction of the card 2. The shutter member 10 is connected with a shutter drive mechanism not shown. The shutter member 10 is structured to be movable between a position where the shutter member 10 closes the card passage and a position where the shutter member 10 opens the card passage.

The magnetic sensor 8 is an MR sensor which utilizes a magnetoresistance effect. The magnetic sensor 8 is disposed on a rear side with respect to the card insertion sensors 9 and on a front side with respect to the shutter member 10 in a passing direction of the card 2. In other words, the magnetic sensor 8 is disposed between the card insertion sensors 9 and the shutter member 10 in a passing direction of the card 2. Further, the magnetic sensor 8 is disposed at a position where a magnetic stripe 2a of a card 2 inserted into the card insertion port 3 is passed.

The magnetic sensor 8 is connected with a control section 14. The control section 14 includes a power supply circuit 15 and supplies electric power to the magnetic sensor 8. The power supply circuit 15 is connected with the magnetic sensor 8 through a switch 17. Further, the control section 14 includes a detection circuit 16 to which an output signal of the magnetic sensor 8 is inputted and thus an output signal of the magnetic sensor 8 is inputted into the control section 14. The detection circuit 16 determines whether magnetic data are recorded in a magnetic stripe 2a or not based on an output signal of the magnetic sensor 8. In this embodiment, the card insertion sensors 9 are also connected with the control section 14.

As shown in FIG. 3(A), when the switch 17 is turned on, electric power is supplied to the magnetic sensor 8 and the magnetic sensor 8 is turned on. Further, when the switch 17 is turned off, supply of the electric power to the magnetic sensor 8 is stopped and the magnetic sensor 8 is turned off. When the magnetic sensor 8 is turned on, the magnetic sensor 8 outputs an output signal. In other words, when electric power is supplied to the magnetic sensor 8 from the control section 14, the magnetic sensor 8 outputs an output signal to the detection circuit 16.

When a time period from a time when a recording area of magnetic data recorded in a magnetic stripe 2a of a card 2 inserted into the card insertion port 3 starts to pass the magnetic sensor 8 to a time when the recording area has finished to pass through the magnetic sensor 8 is defined as a card passage time period "T", the control section 14 supplies electric power to the magnetic sensor 8 during a first supply time period "ΔT" which is shorter than the card passage time period "T" (see FIG. 3). In other words, the control section 14 continuously supplies electric power to the magnetic sensor 8 during the first supply time period "ΔT" which is shorter than the card passage time period "T" for each power supply.

Specifically, the control section 14 supplies electric power during the first supply time period "ΔT" to the magnetic sensor 8 intermittently. In other words, the magnetic sensor 8 is turned on during the first supply time period "ΔT" intermittently to output an output signal. In other words, the magnetic sensor 8 repeats a state that the magnetic sensor 8 is turned on to output an output signal and a state that the magnetic sensor 8 is turned off to stop outputting an output signal at every predetermined time interval. In this embodiment, when it is detected that a card 2 has been inserted into the card insertion port 3 based on a detected result by the card insertion sensors 9, the control section 14 supplies electric power during the first supply time period "ΔT" to the magnetic sensor 8 intermittently, and the magnetic sensor 8 outputs an output signal during the first supply time period "ΔT" intermittently.

In this embodiment, as described below, when it is detected that magnetic data are recorded in a magnetic stripe 2a, the control section 14 stops supplying the electric power to the magnetic sensor 8 afterward. Further, the card passage time period "T" is determined by an inserting speed of a card 2 to the card reader 1 by a user and a conveyance speed of the card 2 by the card conveying mechanism. Dispersion of inserting speeds of a card 2 by a user is large. Therefore, the first supply time period "ΔT" is set to be a sufficiently shorter time period than an assumed card passage time period "T" so that the first supply time period "ΔT" does not become longer than the card passage time period "T". For example, the first supply time period "ΔT" is set to be 10 msec (millisecond) to several 10 msec. Further, a power stopping time period "ΔT1" (see FIG. 3(A)) in which supply of the electric power to the magnetic sensor 8 is stopped intermittently is also set to be a sufficiently shorter time period than an assumed card passage time period "T" so that, when the magnetic sensor 8 is turned off and output of the output signal is stopped, the recording area of magnetic data of a card 2 does not finish to pass through the magnetic sensor 8.

Further, as shown by the "E" part in FIG. 3(B), in a state that the switch 17 is off and thus the control section 14 does not supply electric power to the magnetic sensor 8, when the magnetic sensor 8 is turned on and an output signal of the magnetic sensor 8 is inputted into the control section 14, the control section 14 executes a predetermined abnormality processing. For example, the control section 14 executes an abnormality processing, for example, operation of the card reader 1 is stopped or, an alarm is notified to a host apparatus on which the card reader 1 is mounted.

Control of Card Reader in Card Taking-In Operation

Figure 4:
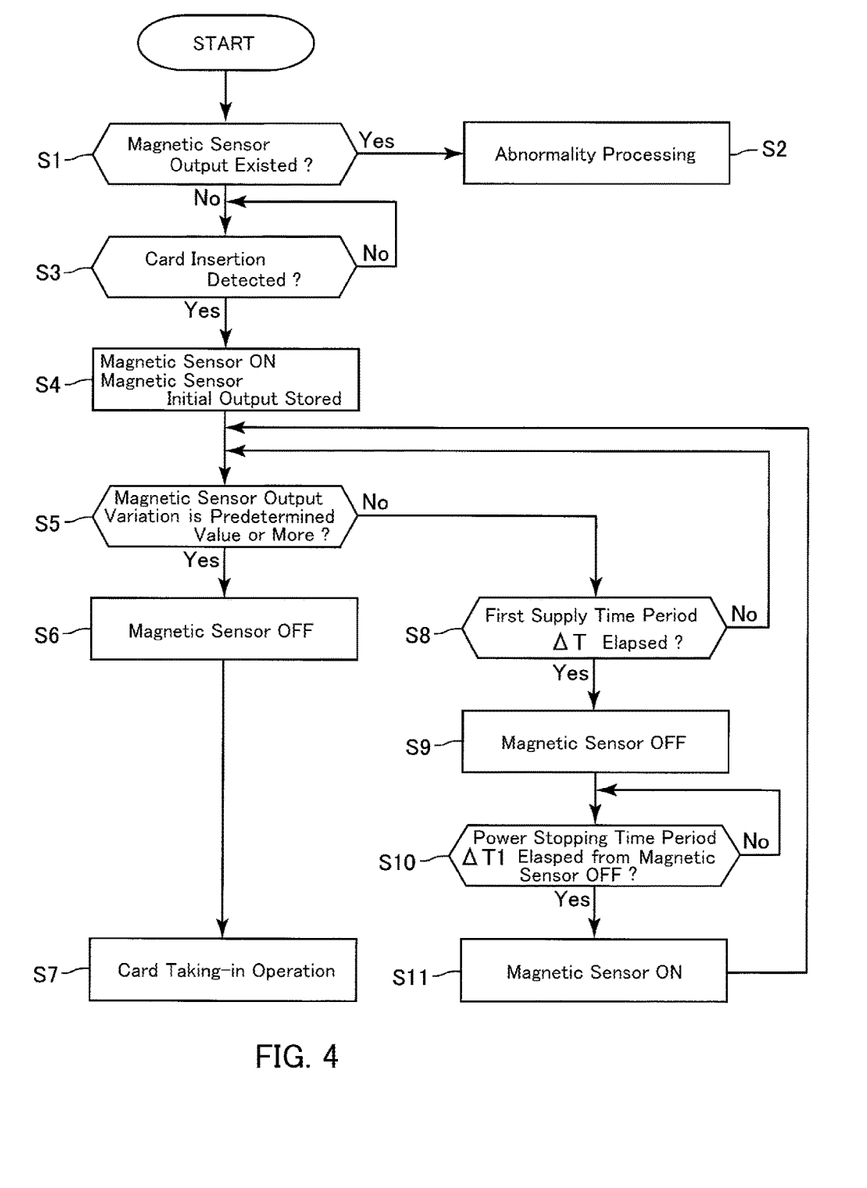
FIG. 4 is a flow chart showing an example of a control flow at a time of taking-in operation of a card in a card reader shown in FIG. 1.

FIG. 4 is a flow chart showing an example of a control flow when taking-in operation of a card 2 is performed in the card reader 1 shown in FIG. 1.

The card reader 1 takes a card 2 into its inside as described below. In other words, in a standby state before a card 2 is inserted into the card reader 1, the control section 14 judges whether an output signal of the magnetic sensor 8 is inputted into the control section 14 (specifically, the detection circuit 16) or not (step "S1"). As described above, when it is detected by the control section 14 that a card 2 has been inserted into the card insertion port 3 based on a detected result by the card insertion sensors 9, the control section 14 supplies electric power to the magnetic sensor 8 and, when the electric power is supplied to the magnetic sensor 8 by the control section 14, the magnetic sensor 8 outputs an output signal. Therefore, in the step "S1", in a standby state, if an output signal of the magnetic sensor 8 is inputted into the control section 14, the output signal is outputted from the magnetic sensor 8 although the control section 14 does not supply electric power to the magnetic sensor 8. Accordingly, it is estimated that some fraudulent act is going to be performed and thus the control section 14 executes an abnormality processing (step "S2") as described above. In this embodiment, in a standby state, the shutter member 10 closes the card passage.

On the other hand, in the step "S1", when an output signal of the magnetic sensor 8 is not inputted into the control section 14 in a standby state, the control section 14 judges whether a card 2 has been inserted into the card insertion port 3 or not based on a detected result by the card insertion sensors 9 (step "S3"). When insertion of a card 2 is detected (when "Yes" in the step "S3"), the control section 14 starts to supply electric power to the magnetic sensor 8 and thus the magnetic sensor 8 is turned on (step "S4"). Further, in the step "S4", the control section 14 stores an initial level of the output signal of the magnetic sensor 8.

After that, the control section 14 judges whether a difference between an output signal level of the magnetic sensor 8 sampled at a predetermined period and the initial level of the output signal of the magnetic sensor 8 stored in the step "S4" (in other words, variation of the output signal of the magnetic sensor 8) is a predetermined value or more or not (step "S5"). In the step "S5", in a case that a variation of the output signal of the magnetic sensor 8 is the predetermined value or more, the control section 14 determines that magnetic data are recorded in a magnetic stripe 2a of the inserted card 2 and stops supplying the electric power to the magnetic sensor 8 to turn the magnetic sensor 8 off (step "S6" 6). After that, a taking-in operation of the card 2 is performed (step "S7"). In the step "S7", the shutter member 10 which has closed the card passage is moved to open the card passage and the card conveying mechanism is activated to take the card 2 into the inside of the main body part 5.

In the step "S5", in a case that a variation of the output signal of the magnetic sensor 8 is less than the predetermined value, the control section 14 determines that a recording area of magnetic data recorded in a magnetic stripe 2a of the inserted card 2 has not reached to a disposing position of the magnetic sensor 8 and determines whether the first supply time period "ΔT" has elapsed or not after supply of the electric power to the magnetic sensor 8 is started in the step "S4" (step "S8"). In the step "S8", in a case that the first supply time period "ΔT" has not elapsed, the flow is returned to the step "S5" and, in a case that, in the step "S8", the first supply time period "ΔT" has elapsed, the control section 14 stops supplying the electric power to the magnetic sensor 8 to turn off the magnetic sensor 8 (step "S9").

After that, the control section 14 judges whether the power stopping time period "ΔT1" has elapsed or not after the magnetic sensor 8 is turned off in the step "S9" (step "S10"). When the predetermined time period has elapsed ("Yes" in the step "S10"), the control section 14 starts supplying electric power to the magnetic sensor 8 again and the magnetic sensor 8 is turned on (step "S11") and, after that, the flow is returned to the step "S5".

A time period from the time when the magnetic sensor 8 is turned on in the step "S4" to the time when the magnetic sensor 8 is turned off in the step "S6" and a time period from the time when the magnetic sensor 8 is turned on in the step "S11" to the time when the magnetic sensor 8 is turned off in the step "S6" become the first supply time period "ΔT" or less. Further, in a case that a variation of an output signal of the magnetic sensor 8 does not become the predetermined value or more in the step "S5" even when the predetermined time period has elapsed after insertion of a card 2 has been detected in the step "S3", the control section 14 determines that a card 2 or the like in which magnetic data are not recorded in a magnetic stripe 2a has been inserted into the card insertion port 3, or determines that a card 2 has been inserted into the card insertion port 3 in a wrong posture, and the control section 14 executes an abnormality processing. In addition, in a case that an output signal of the magnetic sensor 8 is inputted into the control section 14 during a taking-in operation of a card 2 in the step "S7", the output signal is outputted by the magnetic sensor 8 although the control section 14 does not supply electric power to the magnetic sensor 8 and thus it is estimated that some fraudulent act is performed. Therefore, the control section 14 stops the taking-in operation of the card 2 and executes an abnormality processing, for example, an ejecting operation of the card 2 is performed.

Principal Effects in this Embodiment

As described above, in this embodiment, the magnetic sensor 8 outputs an output signal when the control section 14 supplies electric power to the magnetic sensor 8. Further, in this embodiment, the control section 14 supplies the electric power to the magnetic sensor 8 during the first supply time period "ΔT" which is shorter than the card passage time period "T", which is a time period from a time when a recording area of magnetic data recorded in a magnetic stripe 2a of a card 2 inserted into the card insertion port 3 starts to pass the magnetic sensor 8 to a time when the recording area has finished to pass through the magnetic sensor 8. Therefore, according to this embodiment, when a card 2 in which magnetic data are recorded in its magnetic stripe 2a has passed through the magnetic sensor 8, the magnetic sensor 8 outputs a part of a signal corresponding to magnetic data recorded in the card 2 as an output signal. However, the magnetic sensor 8 does not output the entire signal corresponding to magnetic data recorded in the card 2 as an output signal, and thus a criminal cannot acquire the entire signal corresponding to magnetic data recorded in the card 2 from the magnetic sensor 8. Therefore, according to this embodiment, although it can be detected whether magnetic data are recorded in a magnetic stripe 2a or not based on an output signal of the magnetic sensor 8, illegal acquisition of magnetic information by a criminal is prevented. Further, in this embodiment, while detecting whether magnetic data are recorded in a magnetic stripe 2a or not by utilizing a commonly used magnetic sensor 8, illegal acquisition of magnetic information by a criminal is prevented. Therefore, a cost of the card reader 1 can be reduced.

In this embodiment, the control section 14 supplies electric power during the first supply time period "ΔT" to the magnetic sensor 8 intermittently. Further, in this embodiment, the first supply time period "ΔT" and the power stopping time period "ΔT1" are set to be a sufficiently shorter time period than the assumed card passage time period "T". Therefore, according to this embodiment, electric power can be supplied to the magnetic sensor 8 by a simple control when a magnetic stripe 2a of a card 2 is passed through the magnetic sensor 8. Accordingly, in this embodiment, the card reader 1 is easily controlled.

In this embodiment, when it is detected that a card 2 has been inserted into the card insertion port 3 based on a detected result by the card insertion sensors 9, the control section 14 supplies electric power during the first supply time period "ΔT" to the magnetic sensor 8 intermittently. Therefore, in this embodiment, power saving of the card reader 1 can be attained in comparison with a case that, even in a standby state before a card 2 is inserted into the card insertion port 3, electric power is supplied during the first supply time period "ΔT" to the magnetic sensor 8 intermittently.

In this embodiment, the control section 14 executes a predetermined abnormality processing if the magnetic sensor 8 is turned on and an output signal of the magnetic sensor 8 is inputted into the control section 14 although the control section 14 does not supply electric power to the magnetic sensor 8. Therefore, according to this embodiment, even if a criminal performs a predetermined trick in order to make electric power be supplied to the magnetic sensor 8 so that the magnetic sensor 8 outputs the entire signal corresponding to magnetic data recorded in a card 2 as an output signal, illegal acquisition of magnetic information by a criminal is prevented.

The magnetic sensor 8 in this embodiment is an MR sensor. Therefore, according to this embodiment, even when a card 2 is in a stopped state, it can be detected whether magnetic data are recorded in a magnetic stripe 2a of a card 2 or not by the magnetic sensor 8.

Other Embodiments

Although the present invention has been shown and described with reference to a specific embodiment, various changes and modifications will be apparent to those skilled in the art from the teachings herein.

In the embodiment described above, in the step "S5", the control section 14 judges whether or not a difference between an output signal level of the magnetic sensor 8 sampled at a predetermined period and the initial level of the output signal of the magnetic sensor 8 stored in the step "S4" (in other words, variation of the output signal of the magnetic sensor 8) is not less than a predetermined value and, based on the result, the control section 14 detects whether magnetic data are recorded in a magnetic stripe 2a of the inserted card 2 or not. However, the present invention is not limited to this embodiment. For example, it may be structured that the control section 14 judges whether or not an output signal level of the magnetic sensor 8 sampled at a predetermined period is not less than a predetermined value and, based on the result, the control section 14 detects whether magnetic data are recorded in a magnetic stripe 2a of the inserted card 2 or not. In this case, the control section 14 is not required to store an initial level of an output signal of the magnetic sensor 8 in the step "S4". Further, in a case that the control section 14 detects whether magnetic data are recorded in a magnetic stripe 2a of the inserted card 2 or not based on a variation of an output signal of the magnetic sensor 8, the control section 14 is capable of performing accurate detection so that a temporal variation of an output signal of the magnetic sensor 8 due to a temperature variation or the like is eliminated.

In the embodiment described above, the control section 14 supplies electric power during the first supply time period "ΔT" to the magnetic sensor 8 intermittently. However, the present invention is not limited to this embodiment. For example, it may be structured that, in a case that electric power can be supplied to the magnetic sensor 8 when a recording area of magnetic data recorded in a magnetic stripe 2a is passed through the magnetic sensor 8, the control section 14 supplies electric power during the first supply time period "ΔT" once to the magnetic sensor 8 at a predetermined timing after it is detected based on a detected result of the card insertion sensors 9 that a card 2 has been inserted into the card insertion port 3.

In the embodiment described above, when it is detected that a card 2 has been inserted into the card insertion port 3 based on a detected result of the card insertion sensors 9, the control section 14 supplies electric power during the first supply time period "ΔT" to the magnetic sensor 8 intermittently. However, the present invention is not limited to this embodiment. For example, it may be structured that the control section 14 supplies electric power during the first supply time period "ΔT" to the magnetic sensor 8 intermittently also in a standby state before a card 2 is inserted into the card insertion port 3. In this case, the card reader 1 may include no card insertion sensor 9.

In the embodiment described above, the magnetic sensor 8 is an MR sensor which utilizes a magnetoresistance effect. However, the present invention is not limited to this embodiment. For example, the magnetic sensor 8 may be a flux gate sensor structured of an exciting coil, a detection coil and a core around which the exciting coil and the detection coil are wound. Further, the magnetic sensor 8 may be an MI sensor which utilizes magnetic impedance or may be a Hall sensor which utilizes a Hall effect. In other words, a sensor which is structured to output an output signal when electric power is supplied from the control section 14 may be utilized as the magnetic sensor 8. Further, in the embodiment described above, the card reader 1 is a card conveyance type card reader having a card conveying mechanism. However, the card reader 1 may be a manual type card reader in which a card is manually operated by a user.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

The invention claimed is:

1. A card reader for use with a card comprising a magnetic stripe, the card reader comprising:

a magnetic sensor structured to detect whether magnetic data are recorded in the magnetic stripe of the card;
a control section which is structured to supply electric power to the magnetic sensor and into which an output signal of the magnetic sensor is inputted; and
a card insertion part which is formed with a card insertion port into which the card is inserted and in which the magnetic sensor is disposed;
wherein the magnetic sensor outputs an output signal when the electric power is supplied from the control section,
wherein the control section is structured such that, in a case that a time period from a time when a recording area of magnetic data recorded in the magnetic stripe of the card inserted into the card insertion port starts to pass the magnetic sensor to a time when the recording area has finished passing through the magnetic sensor is defined as a card passage time period, the control section supplies the electric power to the magnetic sensor during a first supply time period which is shorter than the card passage time period;
wherein the control section is structured to execute an abnormality processing in a case that an output signal of the magnetic sensor is inputted into the control section when the control section does not supply the electric power to the magnetic sensor.

2. The card reader according to claim 1, wherein the control section is structured to supply the electric power during the first supply time period to the magnetic sensor intermittently.

3. The card reader according to claim 2, further comprising a card insertion sensor structured to detect that the card has been inserted into the card insertion port,
wherein the control section is structured to supply the electric power during the first supply time period to the magnetic sensor intermittently when it is detected that the card has been inserted into the card insertion port based on a detected result of the card insertion sensor.

4. The card reader according to claim 3, wherein the magnetic sensor is an MR sensor which utilizes a magnetoresistance effect.

5. The card reader according to claim 2, wherein the magnetic sensor is an MR sensor which utilizes a magnetoresistance effect.

6. The card reader according to claim 1, wherein the magnetic sensor is an MR sensor which utilizes a magnetoresistance effect.

7. A control method for a card reader comprising a magnetic sensor structured to detect whether magnetic data are recorded in a magnetic stripe of a card or not and a card insertion part which is formed with a card insertion port into which a card is inserted and in which the magnetic sensor is disposed, the control method comprising:
previously providing the magnetic sensor structured to output an output signal when electric power is supplied to the magnetic sensor; and
in a case that a time period from a time when a recording area of magnetic data recorded in a magnetic stripe of the card inserted into the card insertion port starts to pass the magnetic sensor to a time when the recording area has finished to pass through the magnetic sensor is defined as a card passage time period, supplying the electric power to the magnetic sensor during a first supply time period which is shorter than the card passage time period;
wherein in a case that an output signal is outputted by the magnetic sensor when the electric power is not supplied to the magnetic sensor, an abnormality processing is executed.

8. The control method for a card reader according to claim 7, wherein
the electric power is supplied during the first supply time period to the magnetic sensor intermittently, and
it is detected whether magnetic data are recorded in the magnetic stripe of the card having been inserted or not based on an output of the magnetic sensor when the electric power is supplied to the magnetic sensor.

9. The control method for a card reader according to claim 8, wherein
the card reader comprises a card insertion sensor structured to detect that the card has been inserted into the card insertion port, and
when it is detected by the card insertion sensor that the card has been inserted into the card insertion port, the electric power is supplied during the first supply time period to the magnetic sensor intermittently.

10. The control method for a card reader according to claim 9, wherein the magnetic sensor is an MR sensor which utilizes a magnetoresistance effect.

11. The control method for a card reader according to claim 8, wherein the magnetic sensor is an MR sensor which utilizes a magnetoresistance effect.

12. The control method for a card reader according to claim 7, wherein the magnetic sensor is an MR sensor which utilizes a magnetoresistance effect.

* * * * *